US011023208B2

(12) United States Patent
Subramanian et al.

(10) Patent No.: US 11,023,208 B2
(45) Date of Patent: Jun. 1, 2021

(54) TRUE RANDOM NUMBER GENERATOR

(71) Applicant: International Business Machines Corporation, Armonk, NY (US)

(72) Inventors: Chitra K. Subramanian, Mahopac, NY (US); Ghavam G. Shahidi, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 16/254,878

(22) Filed: Jan. 23, 2019

(65) Prior Publication Data

US 2020/0233644 A1   Jul. 23, 2020

(51) Int. Cl.
*G06F 7/58*   (2006.01)

(52) U.S. Cl.
CPC .................................. *G06F 7/588* (2013.01)

(58) Field of Classification Search
CPC .................................. G06F 7/58; G06F 7/588
USPC ......................................... 708/250, 251, 255
See application file for complete search history.

(56) References Cited

U.S. PATENT DOCUMENTS

| 5,706,218 | A  | 1/1998  | Hoffman           |
|-----------|----|---------|-------------------|
| 7,315,874 | B2 | 1/2008  | Hars              |
| 7,424,500 | B2 | 9/2008  | Fukushima et al.  |
| 8,073,888 | B2 | 12/2011 | Lin et al.        |
| 9,189,202 | B2 | 11/2015 | Burleson et al.   |
| 9,405,510 | B2 | 8/2016  | Karpinksyy et al. |
| 9,712,166 | B2 | 7/2017  | Tanamoto et al.   |

| 2008/0091755 | A1* | 4/2008  | Mudge ............... G06F 7/588 |
|              |     |         | 708/250 |
| 2010/0281088 | A1  | 11/2010 | Wilber |
| 2010/0332574 | A1  | 12/2010 | Herbert et al. |
| 2015/0178048 | A1* | 6/2015  | Burleson ............ G06F 7/588 |
|              |     |         | 708/255 |
| 2015/0178143 | A1* | 6/2015  | Mathew .............. G06F 7/00 |
|              |     |         | 714/5.1 |

(Continued)

FOREIGN PATENT DOCUMENTS

CN          101833434 A         9/2010

OTHER PUBLICATIONS

Tokunaga, "True Random Generator with a Metastability-Based Quality Control", IEEE Journal of Solid State Circuits, Jan. 2008, pp. 78-85, vol. 43, No. 1.

(Continued)

*Primary Examiner* — Andrew Caldwell
*Assistant Examiner* — Emily E Larocque
(74) *Attorney, Agent, or Firm* — Scully, Scott, Murphy & Pressser, PC; Daniel P. Morris, Esq.

(57) ABSTRACT

A true random number generator includes a latch circuit, a noise circuit coupled to the latch circuit and an equalization circuit coupled to the inputs of the latch circuit, the equalization circuit being configured to maintain the latch circuit in a balanced state and to allow the latch circuit to resolve from a metastable state based on a timing control. A method of generating a random number output includes maintaining a latch circuit in a balanced state by turning on an equalization circuit coupled to the inputs of the latch circuit, coupling at least one noise source to the latch circuit, allowing the latch circuit to resolve from a metastable state by turning off the equalization circuit and repeatedly turning the equalization circuit on and off based on a timing control.

20 Claims, 6 Drawing Sheets

(56) References Cited

U.S. PATENT DOCUMENTS

2018/0293053 A1* 10/2018 Parker ..................... G06F 7/588

OTHER PUBLICATIONS

Vasyltsov, et al., "Fast Digital TRNG Based on Metastable Ring Oscillator", CHES 2008, LNCS 5154, International Association for Cryptologic Research 2008, Aug. 10, 2008, pp. 164-180.

Taylor et al., "Behind Intel's New Random-Number Generator", IEEE Spectrum, Aug. 24, 2011, pp. 1-3.

Stojanovski, et al., "Chaos-Based Random Number Generalors—Part II: Practical Realization, IEEE Transactions on Circuits and Systems-I:Fundamental Theory and Applications", Mar. 2001, pp. 382-385, vol. 48, No. 3.

Sang-Geun Bae et al., "3-Gb/s High-Speed True Random Number Generator Using Common-Mode Operating Comparator and Sampling Uncertainty of D Flip-Flop", IEEE Journal of Solid-State Circuits, Feb. 2017, pp. 605-610, vol. 52, No. 2.

\* cited by examiner

TRUE RANDOM NUMBER GENERATOR

BACKGROUND OF THE INVENTION

This disclosure is directed generally to random number generation and more particularly to devices, circuits, computer-implemented methods and systems for random number generation.

Random number generation is a key component of the encryption process that protects information by making it unreadable without the proper decryption process. Since the strength of an encryption mechanism is directly related to the randomness of the binary numbers used, there has been an enormous need to design and develop an efficient random number generator that can produce true random numbers to implement a safe and secure cryptographic system.

A true random number generator is built using hardware source. Several methods for generating true random numbers based on physical noise sources such as thermal noise, nuclear decay etc. exist. They require complicated circuits that take up large chip area, power and computation time.

SUMMARY OF THE INVENTION

One embodiment of a random number generator includes a latch circuit having first and second latch inputs and a latch output coupled to the first and second latch inputs; an equalization circuit coupled to the first and second latch inputs of the latch circuit, the equalization circuit being configured to maintain the latch circuit in a balanced state and to allow the latch circuit to resolve from a metastable state based on a timing control; and at least one noise sources coupled to the latch circuit.

One embodiment of A computer implemented method of generating a random number output includes the steps of maintaining a latch circuit in a balanced state by turning on an equalization circuit coupled to the first and second latch inputs of the latch circuit; coupling at least one noise source to the latch circuit; allowing the latch circuit to resolve from a metastable state based on a timing control by turning off the equalization circuit; and generating a series of random bits by repeatedly turning the equalization circuit on and off based on a timing control.

A computer system for generating a random number output, includes one or more computer processors; one or more non-transitory computer-readable storage media; and program instructions, stored on the one or more non-transitory computer-readable storage media, which when implemented by the one or more processors, cause the computer system to generate a random number output, wherein, one or more processors includes a latch module having first and second latch inputs and a latch output coupled to the first and second latch inputs; an equalization module coupled to the first and second latch inputs of the latch module, the equalization module configured to maintain the latch module in a balanced state and to allow the latch module to resolve from a metastable state based on a timing control; and at least one noise source coupled to the latch module.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

The embodiments of the true random number generator ("TRNG") of this disclosure allows any number of random numbers to be generated as needed in a fast and power efficient manner using a small layout footprint. The TRNG of this disclosure provides a power and area efficient random number generator that can be used, for example, in small IoT devices for encryption.

Figure 1:
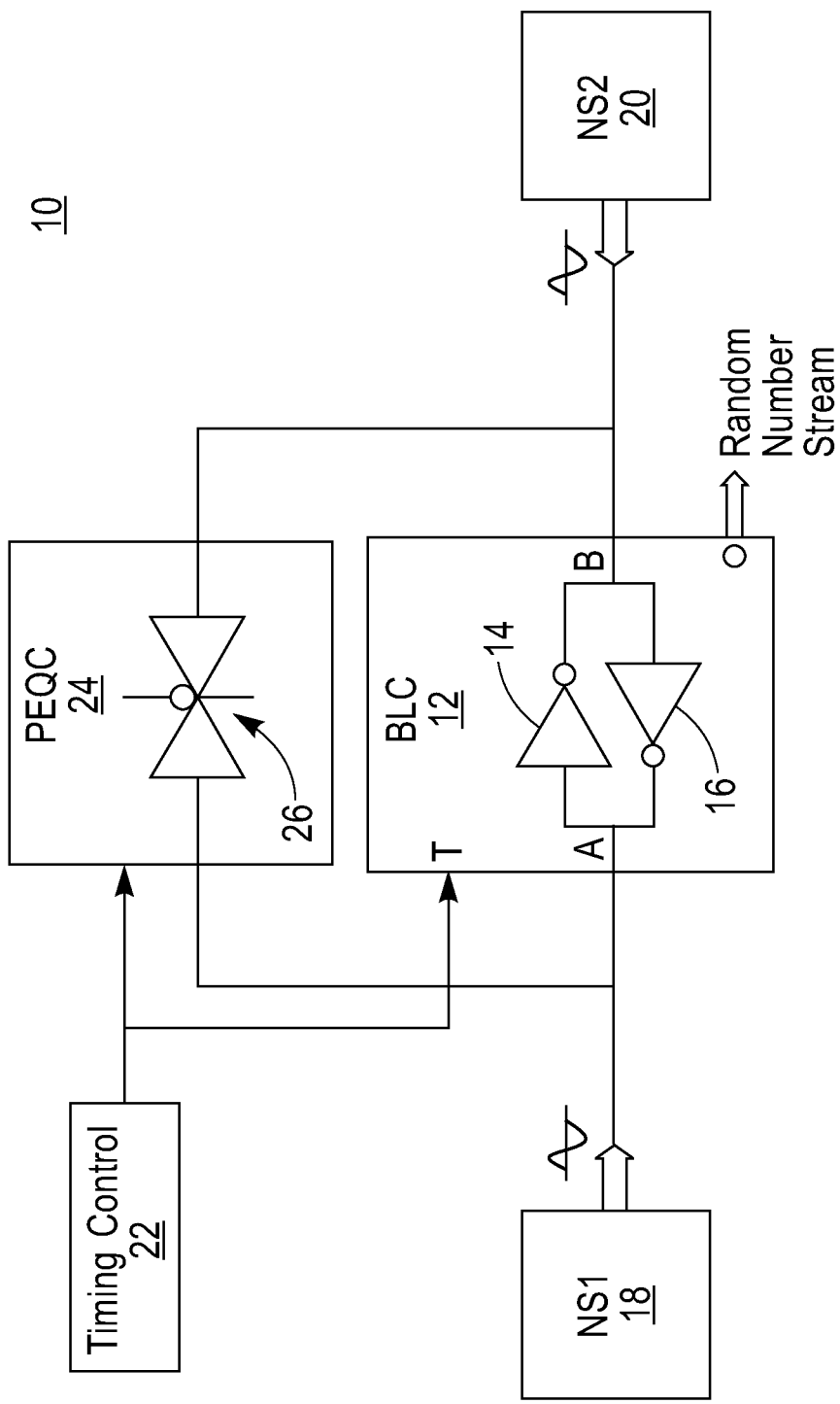
FIG. 1 is a block diagram of one embodiment of the true random number generator disclosed in this specification.

In one embodiment, as shown in FIG. 1, the TRNG 10 uses a nominally balanced latch circuit (BLC) 12 with input ports A and B, output port O, and timing port T to control its mode of operation. In one embodiment, the latch circuit 12 comprises a first inverter 14 and a second inverter 16. The first inverter 14 has an input coupled to an output of the second inverter 16 and to latch input A. The second inverter 16 has an input coupled to the output of the first inverter 14 and to the second latch input B. Input ports A and B are complementary internal nodes that are driven by two independent random noise based voltage sources 18 and 20.

In operation, the latch circuit 12 is held in an unstable state until it is latched by a timing signal from timing control 22 and it resolves into a binary output state based on the relative differential transient noise from sources 18 and 20 on the internal nodes A and B.

In one embodiment, during an initial time period T0 the latch circuit 12 is in a pre-equalization phase based on the operation of a equalization circuit PEQC 24. In one embodiment, equalization circuit 24 comprises a transfer gate 26 connected between latch inputs A and B, respectively. When the equalization circuit 24 is turned on, the latch circuit 12 is disconnected from power and ground, input ports A and B are decoupled from output port O and are shorted together. This drives both half latches formed by inverters 14 and 16 to a common bias point. The independent noise sources 18 and 20 are coupled into ports A and B while the equalization circuit 24 continues to maintain the common bias point.

At a selected time T1, at the end of time period T0, the inverters 14 and 16 of latch circuit 12 are connected to power and ground and the equalization circuit is turned off. The latch circuit 12 is allowed to resolve the output port O randomly to a high or low state based on the relative voltage differential seen across the latch due to the superposition of the noise source voltages. This process is repeated using timing controlled switches to generate a series of random bits.

Figure 2:
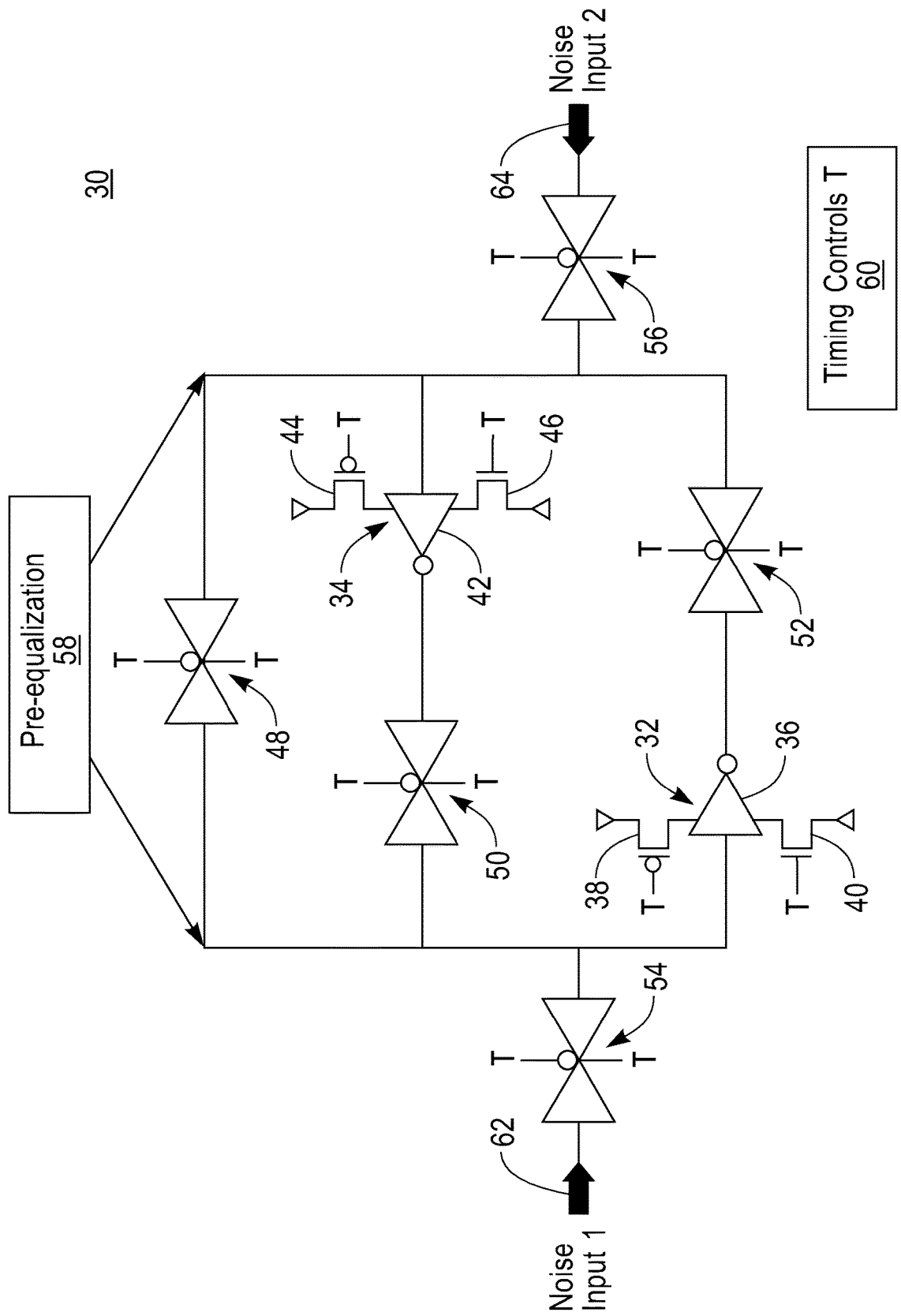
FIG. 2 is a block diagram of one embodiment of the true random number generator disclosed in this specification.

FIG. 2 shows one embodiment a TRNG 30 comprising half latch circuits 32 and 34. Half latch circuit 32 comprises inverter 36 and FETs 38 and 40. Half latch circuit 34 comprises inverter 42 and FETs 44 and 46. Timing controlled switches 48, 50, 52, 54 and 56 provide the pre-equalization circuit 58. The timing control 60 provides the timing signals to the inputs T of the timing control switches 48, 50, 52, 54 and 56 and the FETs 38, 40, 44 and 46 to control the turning on and turning off of the pre-equalization circuit 58. The noise signals are provided at inputs 62 and 64.

TRNG 30 is expected to have mismatch and have a tendency to latch one way. The two noise inputs 62 and 64 are from independent sources and need to vary around one half of the power supply voltage Vdd. The magnitude of the noise inputs should be greater than the latch mismatch. The pre-equalization circuit 58 causes the input nodes of half latches 32 and 34 to be equalized to ½.Vdd, with a maximum gain through the CMOS transfer curve of the FETs in 36, 38, 40, 42, 44 and 46. The timing control 60 maximizes input noise gain and can be tracked with power, voltage, temperature operation.

Figure 3:
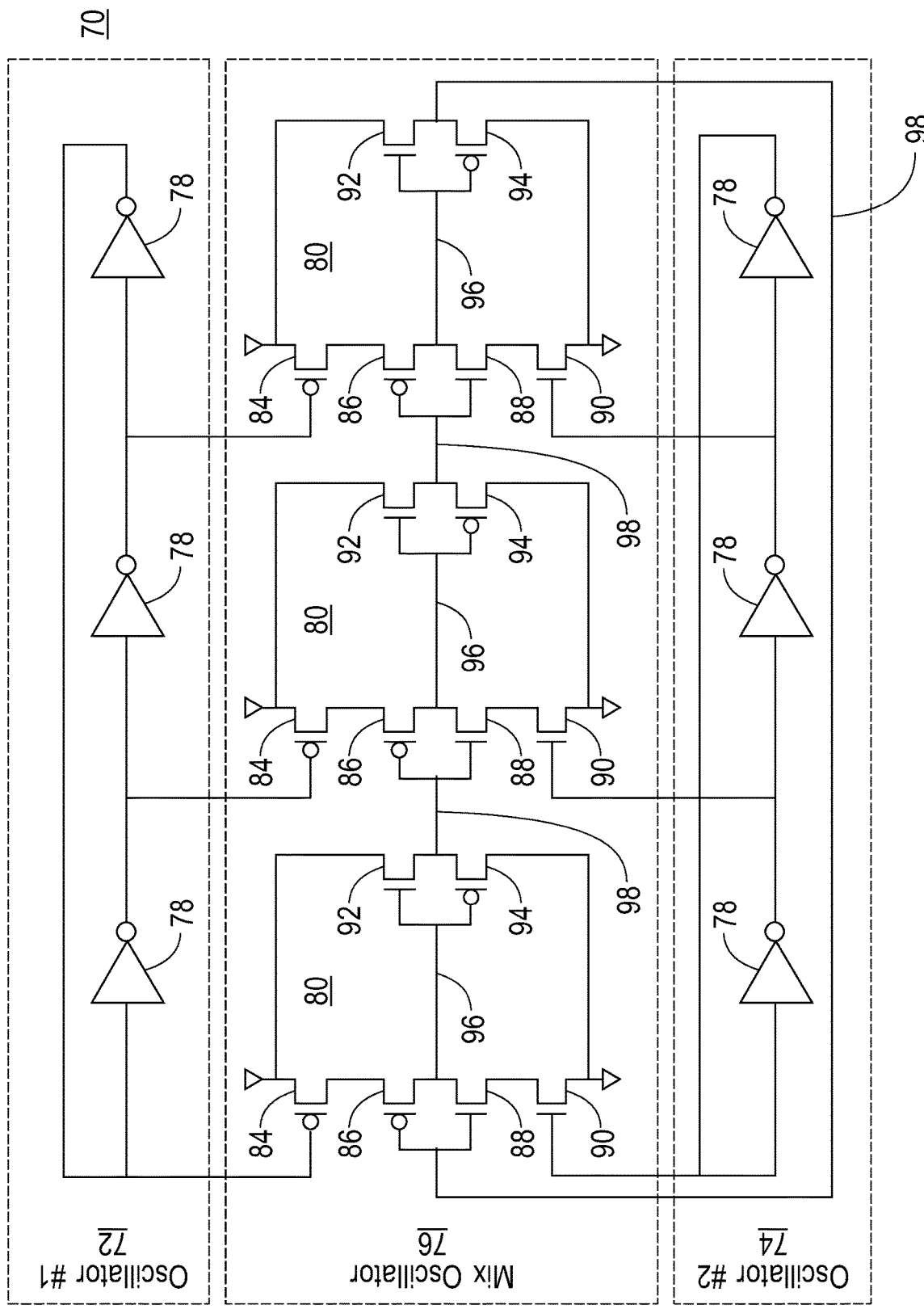
FIG. 3 is a block diagram of one embodiment of the noise generating circuit disclosed in this specification.

In one embodiment, the noise generating circuit comprises first and second oscillators and a mix oscillator coupled between the first and second oscillators. FIG. 3 shows one embodiment of a noise generating circuit 70 comprising oscillators 72 and 74 and mix oscillator 76. The output 98 of the mix oscillator 76 provides one of the independent noise sources to the latch circuit. In one embodiment, oscillators 72 and 74 each include three inverter units 78 connected in series. In one embodiment of the oscillators 72 and 74, the inverter units 78 are each formed of multiple series connected PFETs and NFETs such that their source and drains are connected in series and the gates are connected in parallel. The oscillators 72 and 74 in this form operate at low current and low capacitance to maximize noise voltage sigma/mean. The entire circuit 70 in FIG. 3 constitutes a single noise source. An identical second placement of circuit 70 would provide the second noise source.

Mix oscillator 76 includes three oscillator units 80 connected together in series. Oscillator units 80 derive inputs from the oscillator units 78. Oscillators 72 and 74 are circuits independent of each other that are expected to have power up time offset, expected to have frequency mismatch and have independent frequency jitter due to device noise. Mix oscillator 76 is dependent on inputs from oscillators 72 and 74. The input from oscillator 72 determines pull-up, the input from oscillator 74 determines pull-down and the mix oscillator goes through pull-up, pull-down and crowbar states based on combined inputs from both oscillators 72 and 74 and the state of node 98.

In the embodiment of the mix oscillator 76 shown in FIG. 3, each oscillator unit 80 includes an input stage formed of FETs 84, 86, 88 and 90 and a output stage formed of FETs 92 and 94. In this form, uncorrelated pull-up and pull-down produces random noise voltage excursions on the internal node 96. The output stage has NMOS pull-up and PMOS pull-down FETs. The NMOS pull-up device is limited by its threshold voltage Vtn to only pull up node 98 to a voltage Vtn below the power supply level. Similarly, the PMOS pull-down device is limited by its threshold voltage Vtp to only pull down node 98 to a voltage Vtp above ground. Given low power supply operation, this output stage is thus designed to limit the generated output noise voltage range to around the ½Vdd switching point. The circuit 70 has a single output port 98 that can be tapped from the common connection between any of the three pairs of FETs 92 and 94.

In one embodiment, the mix oscillator unit that has independent pull-up and pull-down stages that are driven by two separate ring oscillator entropy sources. The output is translated to a mid voltage level before being provided to a balanced latch with pre-charge and timing control. The mix oscillator provides greater amplification and delivers greater entropy.

In one embodiment, the noise generation circuit restricts voltage swings to near ½Vdd to improve sensitivity to generated entropy. The mix oscillator and independent restricted noise bias level applied to cross-coupled latch internal nodes maximizes harvested entropy for efficient random number generation.

Figure 4:
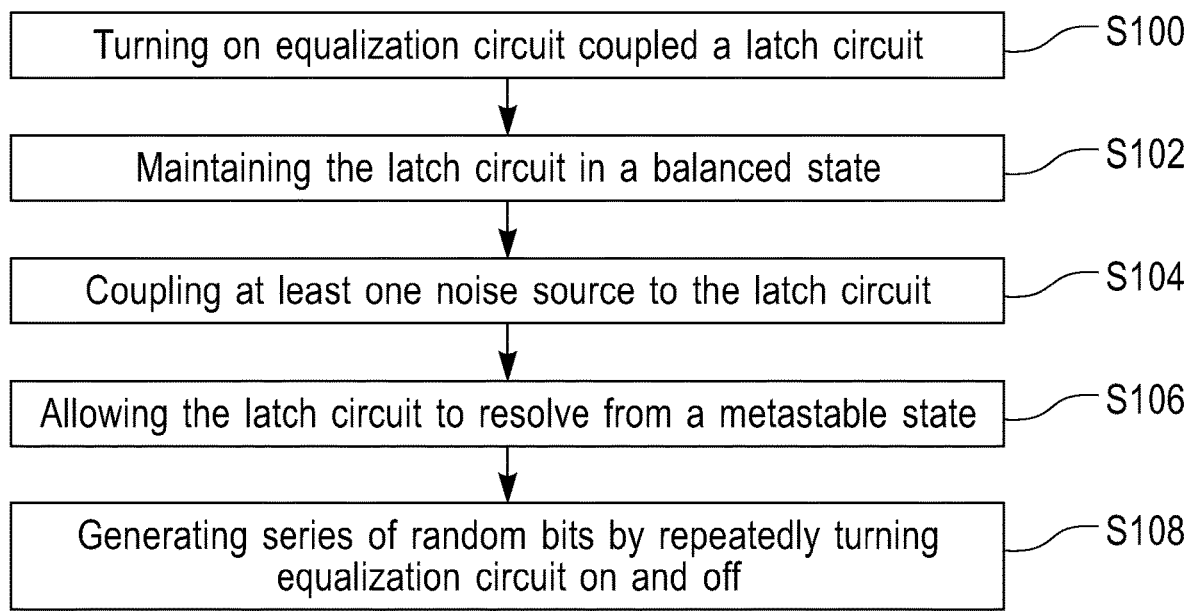
FIG. 4 is a flow diagram of one embodiment of a computer implemented method of generating a random number output disclosed in this specification.

FIG. 4 is a flow diagram of a computer implemented method of generating a random number output using the TRNG circuit described above. The method includes step S100 of turning on an equalization circuit coupled a latch circuit, step S102 of maintaining the latch circuit in a balanced state, step S104 of coupling at least one noise source to the latch circuit, step S106 of allowing the latch circuit to resolve from a metastable state and step S108 of generating series of random bits by repeatedly turning the equalization circuit on and off.

Figure 5:
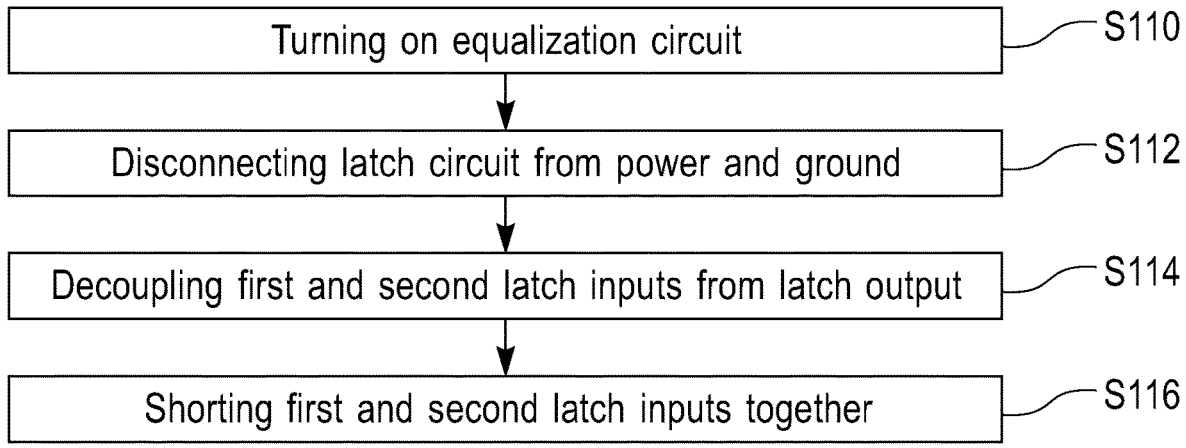
FIG. 5 is a flow diagram of one embodiment of a computer implemented method of generating a random number output disclosed in this specification.

FIG. 5 is a flow diagram of the method of step S110 turning on equalization circuit that includes step S112 of disconnecting the latch circuit from power and ground, step S114 of decoupling the first and second latch inputs from latch output and step S116 of shorting the first and second latch inputs together.

Figure 6:
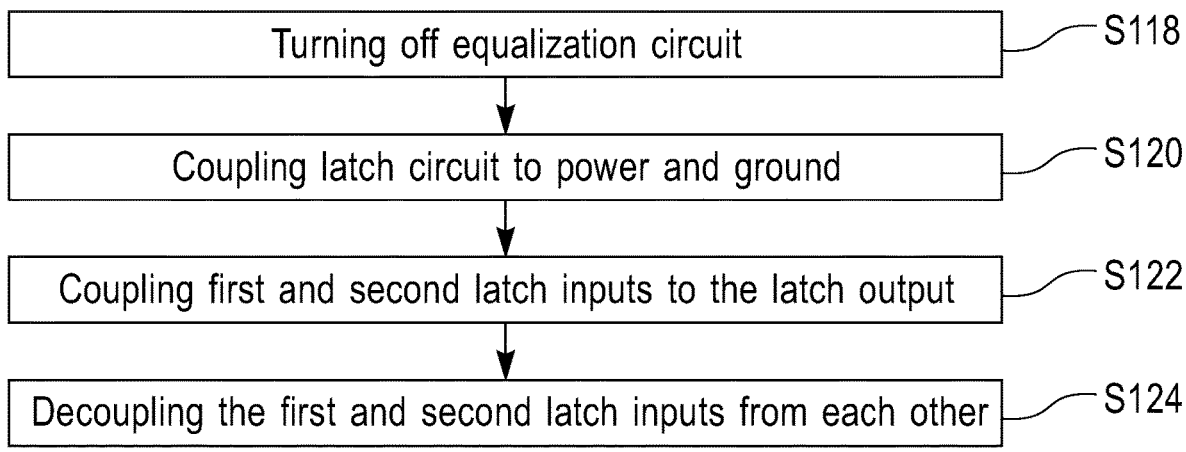
FIG. 6 is a flow diagram of one embodiment of a computer implemented method of generating a random number output disclosed in this specification.

FIG. 6 is a flow diagram of the method of step S118 of turning off equalization circuit that includes step S120 of coupling the latch circuit to power and ground, step S122 of coupling the first and second latch inputs to the latch output and step S124 of decoupling the first and second latch inputs from each other.

As described above, in one embodiment, the true random number generator comprises a balanced latch that is pre-equalized to its balanced condition, where noise is coupled to the sensitive latch node, hence overcoming any device related offsets of the latch. In one embodiment, the true random number generator uses a latch whose internal nodes are driven by independent random signals to produce random internal differential voltage that is then used to resolve the latch at given points in time to generate a random output voltage signal. In one embodiment, the true random number generator uses internal crowbar metastable state resolution of oscillator stages caused by independent pull-up and pull-down drive signals to produce random output frequency jitter as the source of randomness. The embodiments also provide a method of true random number generation using superposition of multiple noise sources to generate output randomness.

Figure 7:
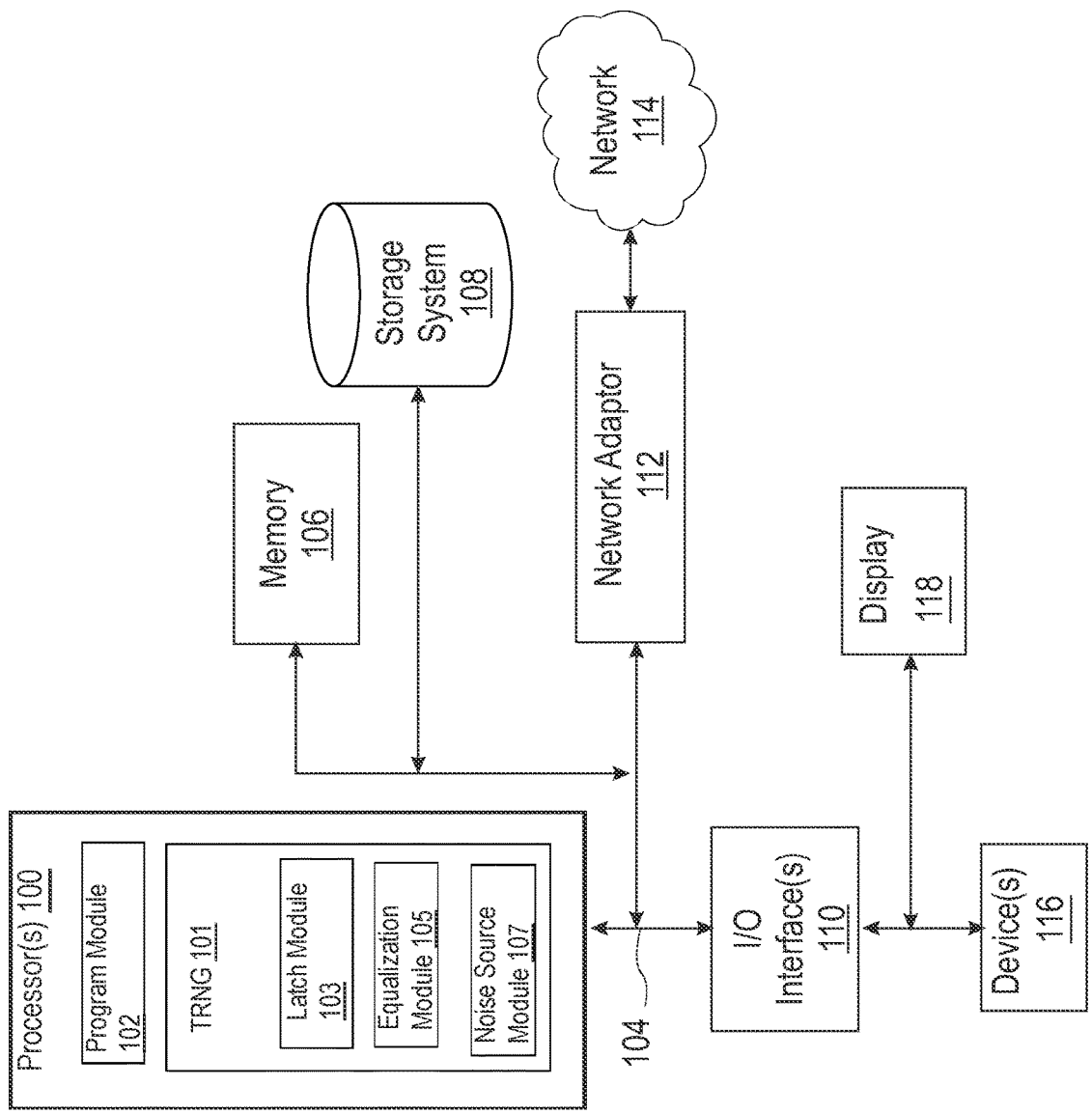
FIG. 7 is a block diagram of an exemplary computing system suitable for implementation of the embodiments of the invention disclosed in this specification.

FIG. 7 illustrates a schematic of an example computer or processing system that may implement the method for generating a random number output in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processors 100 may include a program module 102 that performs the methods described herein. The module 102 may be programmed into the integrated circuits of the processors 100, or loaded from memory 106, storage device 108, or network 114 or combinations thereof.

Processors 100 may include TRNG module 101. TRNG module 101 may include a latch module 103 having first and second latch inputs and a latch output coupled to the first and second latch inputs, an equalization module 105 coupled to the first and second latch inputs of the latch module 103, the equalization module 105 is configured to maintain the latch module 103 in a balanced state and to allow the latch module 103 to resolve from a metastable state based on a timing control and a noise source module 107 that is configured to couple at least one noise source to the latch module 103.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A random number generator comprising:
   a latch circuit having first and second latch inputs and a latch output coupled to the first and second latch inputs;
   an equalization circuit coupled to the first and second latch inputs of the latch circuit, the equalization circuit configured to maintain the latch circuit in a balanced state and to allow the latch circuit to resolve from a metastable state based on a timing control; and
   at least one noise source coupled to the latch circuit.

2. The random number generator of claim 1, wherein the latch circuit comprises first and second inverters, the first inverter having an input coupled to an output of the second inverter and to the first latch input and the second inverter having an input coupled to an output of the first inverter and to the second latch input.

3. The random number generator of claim 2, wherein the equalization circuit comprises a plurality of timing control switches configured to disconnect the latch circuit from power and ground, decouple the first and second latch inputs from the latch output and to short the first and second latch inputs together to maintain the latch circuit in the balanced state.

4. The random number generator of claim 3, wherein the plurality of timing control switches are configured to couple the latch circuit to power and ground, couple the first and second latch inputs to the latch output and decouple the first and second latch inputs from each other to allow the latch circuit resolve from a metastable state.

5. The random number generator of claim of claim 1, wherein the at least one noise source comprises a noise generating circuit having first and second noise sources independent of each other, the first noise source being coupled to the first latch input and the second noise source being coupled to the second latch input, the independent first and second noise sources producing random signals to produce a random internal differential voltage at the first and second latch inputs.

6. The random number generator of claim 5, wherein the noise generating circuit comprises first and second oscillators and a mix oscillator coupled between the first and second oscillators.

7. A computer implemented method of generating a random number output comprising:
maintaining a latch circuit in a balanced state by turning on an equalization circuit coupled to first and second latch inputs of the latch circuit;
coupling at least one noise source to the latch circuit;
allowing the latch circuit to resolve from a metastable state based on a timing control signal by turning off the equalization circuit; and
generating a series of random bits by repeatedly turning the equalization circuit on and off based on a plurality of timing control signals.

8. The method of claim 7, wherein the timing control is provided by a plurality of timing control switches.

9. The method of claim 7, wherein turning on the equalization circuit comprises disconnecting the latch circuit from power and ground, decoupling the first and second latch inputs from a latch output and shorting the first and second latch inputs together.

10. The method of claim 9, wherein turning off the equalization circuit comprises coupling the latch circuit to power and ground, coupling the first and second latch inputs to the latch output and decoupling the first and second latch inputs from each other.

11. The method of claim 7 wherein coupling the at least one noise source to the latch circuit comprises coupling independent random noise signals to each of the first and second latch inputs, respectively, to produce a random internal differential voltage that is used to resolve the latch circuit based on the timing control to generate a random output voltage signal.

12. The method of claim 11, further including generating the independent random noise signals by internal crowbar metastable state resolution of oscillator stages caused by independent pull-up and pull-down drive signals to produce random output frequency jitter as a source of randomness.

13. The method of claim 12, wherein the oscillator stages comprise first and second oscillators and a mix oscillator coupled between the first and second oscillators.

14. A computer system for generating a random number output, comprising:
one or more computer processors;
one or more non-transitory computer-readable storage media; and
program instructions, stored on the one or more non-transitory computer-readable storage media, which when implemented by the one or more processors, cause the computer system to generate a random number output,
wherein, the one or more processors comprises:
a latch module having first and second latch inputs and a latch output coupled to the first and second latch inputs;
an equalization module, having first and second inverters, coupled to the first and second latch inputs of the latch module, the equalization module configured to maintain the latch module in a balanced state and to allow the latch module to resolve from a metastable state based on a timing control; and
at least one noise source coupled to the latch module.

15. The computer system of claim 14, wherein the first inverter has an input coupled to an output of the second inverter and to the first latch input and the second inverter has an input coupled to an output of the first inverter and to the second latch input.

16. The computer system of claim 15, wherein the equalization module comprises a plurality of timing control switches configured to disconnect the latch module from power and ground, decouple the first and second latch inputs from the latch output and to short the first and second latch inputs together to maintain the latch module in the balanced state.

17. The computer system of claim 16, wherein the plurality of timing control switches are configured to couple the latch module to power and ground, couple the first and second latch inputs to the latch output and decouple the first and second latch inputs from each other to allow the latch module to resolve from a metastable state.

18. The computer system of claim 14, wherein the at least one noise source comprises a noise generating module having first and second noise sources independent of each other, the first noise source being coupled to the first latch input and the second noise source being coupled to the second latch input, the independent first and second noise sources producing random signals to produce a random internal differential voltage at the first and second latch inputs.

19. The computer system of claim 18, wherein the noise generating module comprises oscillator stages including first and second oscillators and a mix oscillator coupled between the first and second oscillators.

20. The computer system of claim 19, wherein the noise generating module generates independent random noise signals by internal crowbar metastable state resolution of the oscillator stages caused by independent pull-up and pull-down drive signals to produce random output frequency jitter as a source of randomness.

* * * * *